United States Patent
Andgart et al.

(10) Patent No.: US 9,942,795 B2
(45) Date of Patent: Apr. 10, 2018

(54) ADAPTING QOS FOR A RADIO BEARER

(71) Applicant: Telefonaktiebolaget L M Ericsson (publ), Stockholm (SE)

(72) Inventors: Niklas Andgart, Sodra Sandby (SE); Peter Alriksson, Horby (SE); Joakim Axmon, Kävlinge (SE); Bengt Lindoff, Bjarred (SE); Johan Nilsson, Hollviken (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/651,222

(22) PCT Filed: Jun. 2, 2015

(86) PCT No.: PCT/EP2015/062292
§ 371 (c)(1),
(2) Date: Jun. 10, 2015

(87) PCT Pub. No.: WO2016/192783
PCT Pub. Date: Dec. 8, 2016

(65) Prior Publication Data
US 2017/0142611 A1   May 18, 2017

(51) Int. Cl.
*H04W 80/04* (2009.01)
*H04W 28/02* (2009.01)
(Continued)

(52) U.S. Cl.
CPC ....... *H04W 28/0268* (2013.01); *H04W 4/005* (2013.01); *H04W 28/0252* (2013.01); *H04W 72/0433* (2013.01); *H04W 72/085* (2013.01)

(58) Field of Classification Search
CPC ......... H04W 28/0268; H04W 28/0252; H04W 72/085; H04W 72/0433; H04W 4/005
See application file for complete search history.

(56) References Cited

U.S. PATENT DOCUMENTS

2003/0108059 A1   6/2003 Yew et al.
2012/0044805 A1*  2/2012 Lee ................ H04L 47/215
                                              370/230
(Continued)

FOREIGN PATENT DOCUMENTS

EP   1978685 A1   10/2008

OTHER PUBLICATIONS

3GPP TS 23.203 V12.7.0 "Policy and charging control architecture (Release 12)" Dec. 2014, Section 4.1, pp. 1-222.
(Continued)

*Primary Examiner* — Andrew Lee
(74) *Attorney, Agent, or Firm* — Leffler Intellectual Property Law, PLLC

(57) ABSTRACT

The present disclosure relates to a method performed in a radio device 4 connected to a communication network 1 comprising a core network (CN) and a Radio Access Network (RAN), where there is a communication bearer between the radio device and the CN via the RAN comprising a radio bearer between the radio device and a RAN node of the RAN, for adapting a Quality of Service (QoS) of the communication bearer. The method comprises, to the CN, sending a request for a first QoS to be associated with the communication bearer. The method also comprises exchanging data over the radio bearer in accordance with the first QoS of the communication bearer. The method also comprises, to the RAN, sending an indication that a second QoS, lower than the first QoS, should be used for the radio bearer. The method also comprises exchanging data over the radio bearer in accordance with the second QoS.

24 Claims, 9 Drawing Sheets

(51) Int. Cl.
  *H04W 72/08* (2009.01)
  *H04W 72/04* (2009.01)
  *H04W 4/00* (2018.01)

(56) References Cited

U.S. PATENT DOCUMENTS

| | | | | |
|---|---|---|---|---|
| 2012/0142278 | A1* | 6/2012 | Wang | H04W 36/0016 455/68 |
| 2013/0115914 | A1* | 5/2013 | Zhou | H04W 48/18 455/410 |
| 2014/0029536 | A1* | 1/2014 | Tian | H04W 72/087 370/329 |
| 2014/0066084 | A1 | 3/2014 | Paladugu | |
| 2015/0003246 | A1* | 1/2015 | Chandramouli | H04W 28/0289 370/235 |
| 2015/0094073 | A1* | 4/2015 | Peng | H04W 76/022 455/450 |
| 2015/0117347 | A1* | 4/2015 | Iwai | H04W 76/041 370/329 |
| 2016/0057689 | A1* | 2/2016 | Fujishiro | H04W 36/16 370/331 |
| 2016/0227574 | A1* | 8/2016 | Raina | H04W 72/14 |
| 2016/0338130 | A1* | 11/2016 | Park | H04W 76/021 |
| 2017/0105227 | A1* | 4/2017 | Pinheiro | H04W 72/087 |

OTHER PUBLICATIONS

3GPP TS 23.207 V12.0.0 "End-to-end Quality of Service (QoS) concept and architecture (Release 12)" Sep. 2014, Section 4.1, pp. 1-39.
3GPP TS 23.401 V12.7.0 "General Packet Radio Service (GPRS) enhancements for Evolved Universal Terrestrial Radio Access Network (E-UTRAN) access (Release 12)" Dec. 2014, Section 4.7.2, pp. 1-308.
3GPP TS 24.301 V12.7.0 "Non-Access_Stratum (NAS) protocol for Evolved Packet System (EPS); Stage 3 (Release 12)" Dec. 2014, Section 6.5.4, pp. 1-372.
PCT International Search Report, dated Feb. 12, 2016, in connection with International Application No. PCT/EP2015/062292, all pages.
PCT Written Opinion, dated Feb. 12, 2016, in connection with International Application No. PCT/EP2015/062292, all pages.
3GPP TS 23.401 V13.2.0 (Mar. 2015), 3rd Generation Partnership Project; Technical Specification Group Services and System Aspects; General Packet Radio Service (GPRS) enhancements for Evolved Universal Terrestrial Radio Access Network (E-UTRAN) access (Release 13), 313 pages.
3GPP TS 23.207 V12.0.0, Sep. 2014, 3rd Generation Partnership Project; Technical Specification Group Services and System Aspects; End-to-end Quality of Service (QoS) concept and architecture, Release 12, pp. 1-39.
3GPP TS 23.401 V12.7.0, Dec. 2014, 3rd Generation Partnership Project; Technical Specification Group Services and System Aspects; General Packet Radio Service (GPRS) enhancements for Evolved Universal Terrestrial Radio Access Network (E-UTRAN) access, Release 12, pp. 1-308.
3GPP TS 24.301 V12.7.0, Dec. 2014, 3rd Generation Partnership Project; Technical Specification Group Core Network and Terminals; Non-Access-Stratum (NAS) protocol for Evolved Packet System (EPS); Stage 3, Release 12, pp. 1-372.
3GPP TS 23.203 V12.7.0,Dec. 2014, 3rd Generation Partnership Project; Technical Specification group Services and System Aspects; Policy and charging control architecture, Release 12, pp. 1-222.

* cited by examiner

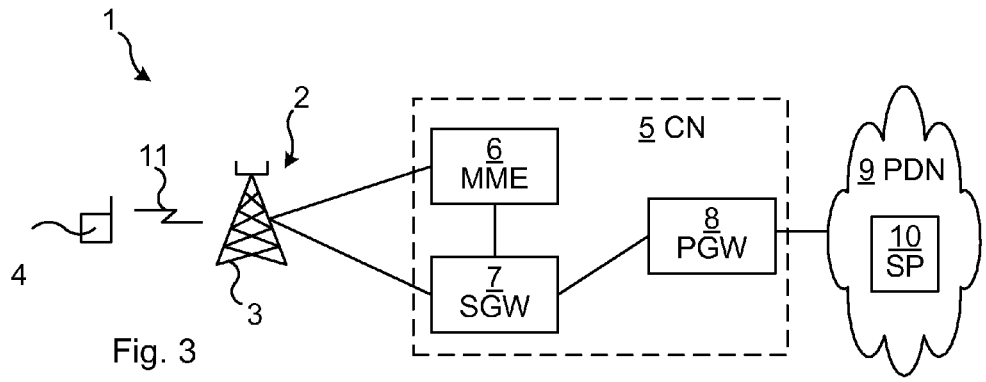
Fig. 3
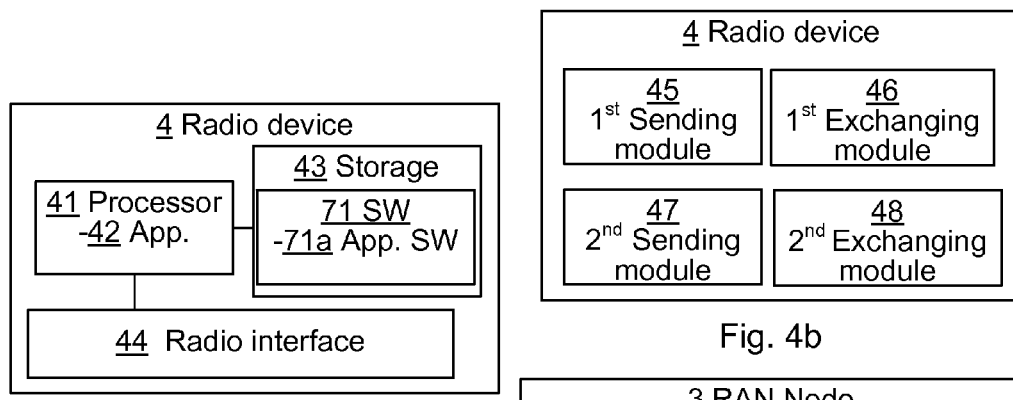
Fig. 4b
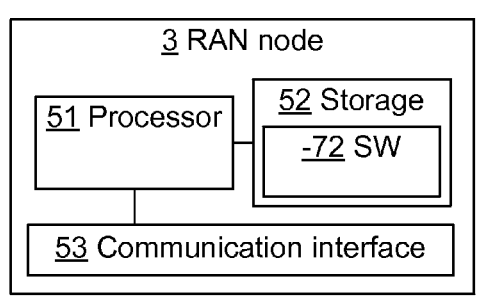
Fig. 4a
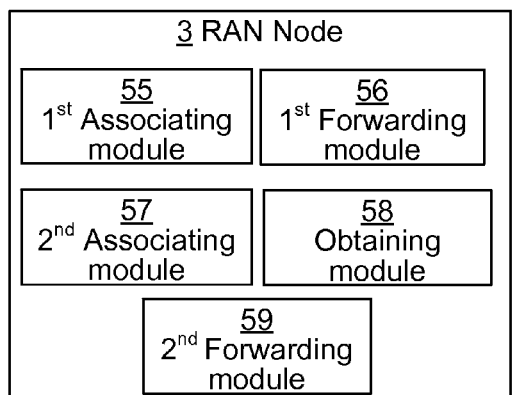
Fig. 5b
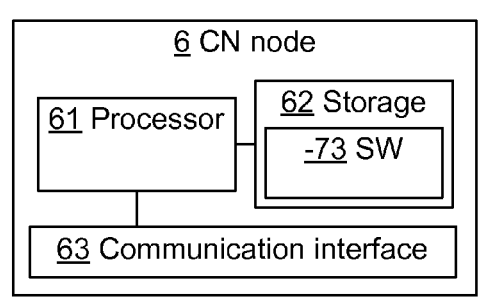
Fig. 5a
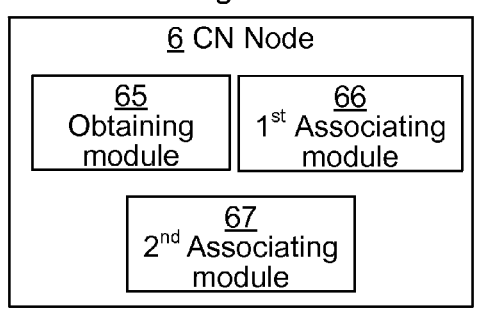
Fig. 6a
Fig. 6b

ADAPTING QOS FOR A RADIO BEARER

TECHNICAL FIELD

The present disclosure relates to methods and devices for adapting Quality of Service (QoS) in a radio communication network.

BACKGROUND

Mission-Critical MTC Devices

Mission-critical Machine Type Communication (MTC), C-MTC, devices used for communication in e.g. manufacturing, process industry, automotive or medical applications call for higher reliability and lower latency than previously supported in legacy systems (communication standards (generations, G) of the Third Generation Partnership Project (3GPP) 2G, 3G, 4G up to standard Release (Rel) 12) in order to maintain robust control loop functions. Message delays over the wireless link as well as the roundtrip time (RTT) must be kept low. Typical requirements are maximum message delay of no more than 20 milliseconds (ms) and only 0.001 parts per million (ppm) of messages violating this latency requirement. In order to meet such requirements in 4G, e.g. Long Term Evolution (LTE), strict requirements are put on the physical layer not to introduce transport block errors since each retransmission add 8 ms to the message delay. Moreover, interruption of the wireless link must be minimized.

Quality of Service

A standardized QoS concept is applied in 4G and has been designed to allow a service application (app) on a radio device such as a User Equipment (UE) to request end-to-end quality of service. Requirements to be fulfilled by the QoS mechanism are described in (3GPP Technical Specification (TS) 23.207 Version (V) 12.0.0 clause 4.1). It is explicitly stated that the QoS mechanism shall avoid unnecessary processing or complexity both in the UE and in the network nodes, and that unnecessary signalling traffic arising from QoS negotiations shall be avoided.

Each Evolved Packet System (EPS) bearer is associated with a QoS class indicator (QCI) which determines which scheduling policy, queue management policy, rate shaping policy, Radio Link Control (RLC) configuration etc. shall apply for data packets transported between the UE and the serving gateway (SGW) over that bearer (3GPP TS 23.401 V12.7.0 clause 4.7.2). In case of different applications having different QCIs those are mapped to different EPS bearers. Two types of bearers exist, those with guaranteed minimum bitrate (GBR type), and those without such guaranteed bitrate (non-GBR type).

User plane (data) bearers are activated, modified and deactivated by the UE or by the Packet Data Network, PDN, gateway (PGW). On UE side it is handled by the non-access stratum (NAS) which connects the UE to the Mobility Management Entity (MME) that relays the request to the SGW, which in turn relays the request to the PGW (see FIG. 1 for the network architecture of LTE). FIG. 1 shows an LTE architecture with a Radio Access Network (RAN) comprising a plurality of evolved Node B (eNB) base stations each serving one or several cells, with a UE connected to one of the eNB over a radio interface. Each eNB is connected to an SGW for user plane signalling and to an MME for control plane signalling over interfaces named in the figure. The RAN is connected to a PDN such as the Internet via a PGW. The UE specifies the required QoS when activating an EPS bearer, and may also request a modification of an existing bearer—for instance requesting change of the guaranteed bitrate or the QCI by sending a QoS information element with one or more modified parameter values (3GPP TS 24.301 V12.7.0 clause 6.5.4). The PGW responds by rejecting the request, modifying an existing bearer to the desired QoS, or activating a new bearer with the desired QoS to replace the bearer the UE requested to modify.

Standardized QoS levels are shown a table in 3GPP TS 23.203 V12.7.0 clause 6.1.7 for various QCIs. Priority levels are such that the lower the number the higher the priority. The packet delay budget covers end-to-end latency, including radio link(s) and other parts of the network infrastructure. The packet error loss rate is however only for the radio link since no packet loss is expected in the core network (CN) except for losses or latencies due to congestion. The actual packet delay shall in general be lower than indicated in the table for each of the QCIs, particularly for the GBR type of resources, provided that the UE experiences a sufficiently good radio link quality.

In case the eNB cannot sustain the bitrate guaranteed for a bearer it has no other option than to deactivate the concerned bearer since there is no mechanism for re-negotiating QoS between the eNB and the PGW (3GPP TS 23.401 V12.7.0 clause 4.7.2).

FIG. 2 illustrates the nomenclature of different bearers in LTE. Between the in UE and a peer entity (e.g. a service provider, SP) there is an end-to-end connection which comprises an EPS bearer between the UE and the PGW and an external bearer. The EPS bearer comprises an evolved radio access bearer (E-EAB) between the UE and the SGW, and an S5/S8 bearer. The E-RAB in its turn comprises a radio bearer between the UE and the eNB, and an S1 bearer over the S1 interface.

SUMMARY

Different applications have different requirements on latency and reliability. Typically the base station control loops try to keep a predefined block error rate (BLER) target, often around 10% when hybrid automatic repeat request (HARQ) is used. The BLER target is often chosen to optimize system throughput while accepting a number of retransmissions. For applications with low latency requirements retransmissions might not be acceptable. On the other hand, avoiding retransmissions will cost a lot of system resources since more robust encoding has to be used, leading to fewer radio resources being available for other devices.

Many services do not require low latency and/or high reliability all the time. Rather, they are only very sensitive to large latencies during some critical time periods. Current solutions do not address this in an optimal way resulting in either wasting system resources or causing long latencies.

It is an objective of the present disclosure to provide an improved way of adapting the QoS, especially when the service temporarily does not need as high QoS as its bearer has been granted.

According to an aspect of the present disclosure, there is provided a method performed in a radio device connected to a communication network comprising a CN and a 2, where there is a communication bearer between the radio device and the CN via the RAN, the communication bearer comprising a radio bearer between the radio device and a RAN node of the RAN. The method is for adapting a QoS of the communication bearer. The method comprises, to the CN, sending a request for a first QoS to be associated with the communication bearer. The method also comprises exchanging data over the radio bearer in accordance with the first QoS of the communication bearer. The method also comprises, to the RAN, sending an indication that a second QoS, lower than the first QoS, should be used for the radio bearer. The method also comprises exchanging data over the radio bearer in accordance with the second QoS.

According to another aspect of the present disclosure, there is provided a method performed in a RAN comprised in a communication network also comprising a CN where there is a communication bearer between a radio device connected to the communication network and the CN via the RAN, the communication bearer comprising a radio bearer between the radio device and a RAN node of the RAN. The method is for adapting a QoS of the communication bearer. The method comprises associating the communication bearer, including the radio bearer, with a first QoS. The method also comprises initiating forwarding of data over the radio bearer in accordance with the first QoS of the communication bearer. The method also comprises associating the radio bearer also with a second QoS, lower than the first QoS, while the communication bearer remains associated with the first QoS. The method also comprises obtaining an indication that the second QoS should be used for the radio bearer. The method also comprises initiating forwarding of data over the radio bearer in accordance with the second QoS.

According to another aspect of the present disclosure, there is provided a method performed in a CN comprised in a communication network also comprising a RAN, where there is a communication bearer between a radio device connected to the communication network and the CN via the RAN, the communication bearer comprising a radio bearer between the radio device and a RAN node of the RAN. The method is for adapting a QoS of the communication bearer. The method comprises obtaining a request for a first and a second QoS to be associated with the communication bearer, the request being from the radio device, the second QoS being lower than the first QoS. The method also comprises initiating associating of the communication bearer with the first QoS in a PGW. The method also comprises initiating associating of the radio bearer with both the first and the second QoS in the RAN.

According to another aspect of the present disclosure, there is provided a radio device comprising processor circuitry, and storage storing instructions executable by said processor circuitry whereby said radio device is operative to, to a CN via a RAN, send a request for a first QoS to be associated with a communication bearer between the radio device and the CN via the RAN, the communication bearer comprising a radio bearer between the radio device and a RAN node of the RAN. The radio device is also operative to exchange data over the radio bearer in accordance with the first QoS of the communication bearer. The radio device is also operative to, to the RAN, send an indication that a second QoS, lower than the first QoS, should be used for the radio bearer. The radio device is also operative to exchange data over the radio bearer in accordance with the second QoS.

According to another aspect of the present disclosure, there is provided a RAN arrangement for a RAN, the arrangement comprising processor circuitry, and storage storing instructions executable by said processor circuitry whereby said RAN arrangement is operative to associate a communication bearer between a radio device and a CN via the RAN, including a radio bearer comprised in the communication bearer between the radio device and a RAN arrangement of the RAN, with a first QoS. The RAN arrangement is also operative to initiate forwarding of data over the radio bearer in accordance with the first QoS of the communication bearer. The RAN arrangement is also operative to associate the radio bearer also with a second QoS, lower than the first QoS, while the communication bearer remains associated with the first QoS. The RAN arrangement is also operative to obtain an indication that the second QoS should be used for the radio bearer. The RAN arrangement is also operative to initiate forwarding of data over the radio bearer in accordance with the second QoS.

According to another aspect of the present disclosure, there is provided a CN arrangement for a CN, the arrangement comprising processor circuitry, and storage storing instructions executable by said processor circuitry whereby said CN arrangement is operative to obtain a request for a first and a second QoS to be associated with a communication bearer between a radio device and the CN via a RAN, from the radio device, the second QoS being lower than the first QoS. The CN arrangement is also operative to initiate associating of the communication bearer with the first QoS in a PGW. The CN arrangement is also operative to initiate associating of a radio bearer, comprised in the communication bearer, between the radio device and a RAN node of the RAN with both the first and the second QoS in the RAN.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program product comprising computer-executable components for causing a RAN arrangement to perform an embodiment of a method of the present disclosure when the computer-executable components are run on processor circuitry comprised in the RAN arrangement.

According to another aspect of the present disclosure, there is provided a computer program product comprising computer-executable components for causing a CN arrangement to perform an embodiment of a method of the present disclosure when the computer-executable components are run on processor circuitry comprised in the CN arrangement.

According to another aspect of the present disclosure, there is provided a computer program for adapting a QoS of a communication bearer between a radio device and a CN via a RAN, the communication bearer comprising a radio bearer between the radio device and a RAN node of the RAN. The computer program comprises computer program code which is able to, when run on processor circuitry of the radio device, cause the radio device to, to the CN, send a request for a first QoS to be associated with the communication bearer. The code is also able to cause the radio device to exchange data over the radio bearer in accordance with the first QoS of the communication bearer. The code is also able to cause the radio device to, to the RAN, send an indication that a second QoS, lower than the first QoS, should be used for the radio bearer. The code is also able to cause the radio device to exchange data over the radio bearer in accordance with the second QoS.

According to another aspect of the present disclosure, there is provided a computer program for adapting a QoS of a communication bearer between a radio device and a CN via a RAN, the communication bearer comprising a radio bearer between the radio device and a RAN node of the RAN. The computer program comprises computer program code which is able to, when run on processor circuitry of a RAN arrangement, cause the RAN arrangement to associate the communication bearer, including the radio bearer, with a first QoS. The code is also able to cause the RAN arrangement to initiate forwarding of data over the radio bearer in accordance with the first QoS of the communication bearer. The code is also able to cause the RAN arrangement to associate the radio bearer also with a second QoS, lower than the first QoS, while the communication bearer remains associated with the first QoS. The code is also able to cause the RAN arrangement to obtain an indication that the second QoS should be used for the radio bearer. The code is also able to cause the RAN arrangement to initiate forwarding of data over the radio bearer in accordance with the second QoS.

According to another aspect of the present disclosure, there is provided a computer program for adapting a QoS of a communication bearer between a radio device and a CN via a RAN, the communication bearer comprising a radio bearer between the radio device and a RAN node of the RAN. The computer program comprises computer program code which is able to, when run on processor circuitry of a CN arrangement, cause the CN arrangement to obtain a request for a first and a second QoS to be associated with the communication bearer, from the radio device, the second QoS being lower than the first QoS. The code is also able to cause the CN arrangement to initiate associating of the communication bearer with the first QoS in a Packet Data Network Gateway, PGW. The code is also able to cause the CN arrangement to initiate associating of the radio bearer with both the first and the second QoS in the RAN.

According to another aspect of the present disclosure, there is provided a computer program product comprising an embodiment of a computer program of the present disclosure, and a computer readable means on which the computer program is stored.

In accordance with embodiments of the present disclosure, a service application in the radio device can by means of the second QoS dynamically signal to the RAN at which of the at least two QoS levels it want to be operating. This allows the eNB or other RAN node to determine whether to apply e.g. a robust encoding (lower Modulation and Coding Scheme, MCS) and prioritized scheduling according to the first QoS or to apply a less robust encoding and/or lower priority and/or lower guaranteed bitrate according to the at least one alternative lower (second) QoS. Additionally or alternatively to different encoding and/or priorities, other parameters may be adjusted depending on whether the first or the second QoS is used, for example whether to use a shorter or longer Transmission Time Interval (TTI) length, or change other transmission properties such as e.g. Radio Access Technology (RAT), Multiple Input Multiple Output (MIMO) transmission modes, beam forming, pre-coding matrix and transmission power. The PGW may still be configured to transmit the bearer traffic according to the higher QoS during the entire session or during periods of such session where the application frequently is transitioning between states that require different QoS levels but where the overhead and delay of radio device initiated bearer resource modification request cannot be tolerated.

By having the service application indicating when it is operating in a less critical mode, the RAN (e.g. the serving eNB) is allowed to release resources which it instead can allocate to other radio devices or bearers rather than spend on unnecessarily robust transmissions on the communication bearer of the radio device which is serving the application. The result may be a higher overall system throughput.

The released resources may further give the RAN a margin that it can use when securing the GBR of bearers, thus reducing the risk for the eNB having to deactivate a bearer due to capacity shortage.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3 is a schematic diagram of a communication network in accordance with the present disclosure.

FIG. 4a is a schematic block diagram of an embodiment of a radio device in accordance with the present disclosure.

FIG. 4b is a schematic functional block diagram of an embodiment of a radio device in accordance with the present disclosure.

FIG. 5a is a schematic block diagram of an embodiment of a RAN arrangement in the form of a RAN node, in accordance with the present disclosure.

FIG. 5b is a schematic functional block diagram of an embodiment of a RAN arrangement in the form of a RAN node, in accordance with the present disclosure.

FIG. 6a is a schematic block diagram of an embodiment of a CN arrangement in the form of a CN node, in accordance with the present disclosure.

FIG. 6b is a schematic functional block diagram of an embodiment of a CN arrangement in the form of a CN node, in accordance with the present disclosure.

DETAILED DESCRIPTION

Figure 1:
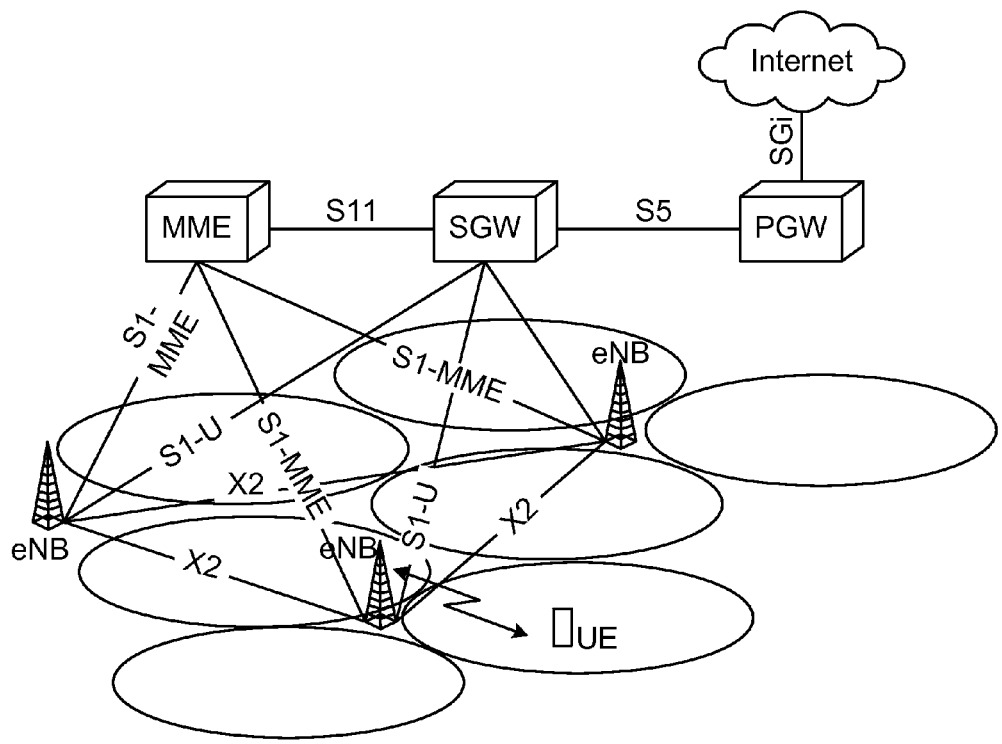
FIG. 1 is a schematic diagram over a standard LTE architecture.
Figure 2:
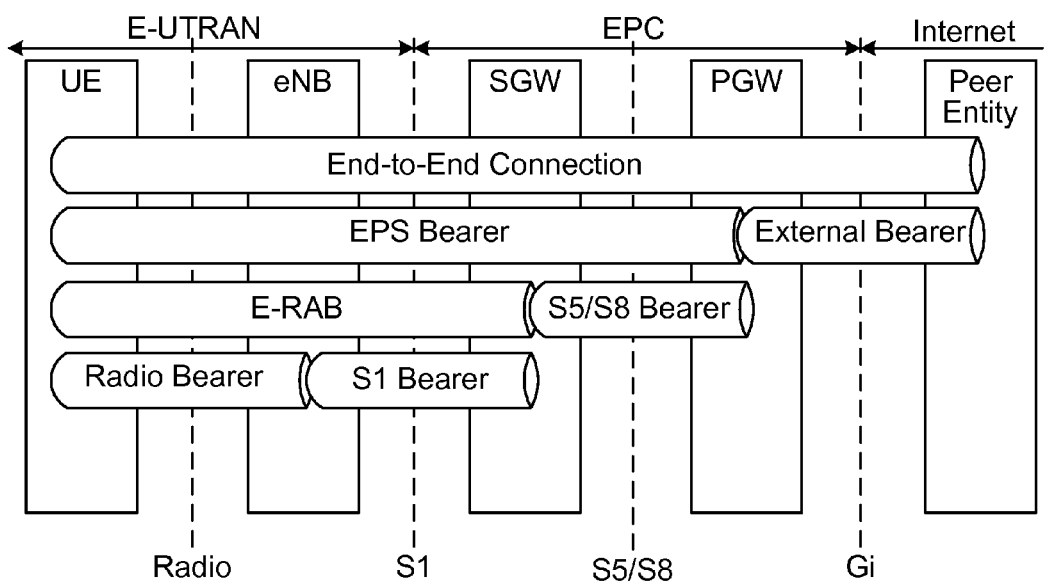
FIG. 2 is a schematic diagram illustrating different bearers in a standard LTE architecture.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 3 is a schematic block diagram of a radio device 4 connected to a communication network 1 over at least one radio bearer 11. The communication network 1 comprises a RAN 3, typically a cellular RAN in accordance with a 3GPP standard, comprising one or a plurality of RAN nodes 3, e.g. evolved Node B (eNB) or Node B in combination with Radio Network Controller (RNC). The communication network 1 also comprises a CN 5 comprising an SGW 7 and a PGW 8 as well as an MME 6, as well as any other standard CN nodes needed. Via the PGW, the communication network is connected to the PDN 9, e.g. the Internet, in which a service provider (SP) 10 resides with one or a plurality of servers, e.g. Content Delivery Network (CDN) servers, for providing a service to a service application (app) acting as a client for the service in the radio device.

The radio device 4 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

FIG. 4a schematically illustrates an embodiment of a radio device 4 of the present disclosure. The radio device 4 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software (SW) 71 (see also FIG. 7) stored in a storage 43 of one or several storage unit(s) e.g. a memory. Thus, the service application 42 (e.g. a service client in the form of an app) may be formed in the processor circuitry 41 by application SW 71a stored in the storage 43 running on the processor circuitry 41. The storage unit is regarded as a computer readable means 74 (see FIG. 7) as discussed herein and may e.g. be in the form of a Random Access Memory (RAM), a Flash memory or other solid state memory, or a hard disk, or be a combination thereof. The processor circuitry 41 may also be configured to store data in the storage 43, as needed. The radio device 4 also comprises a radio communication interface 44 for communication with/via the communication network 1 e.g. via the RAN node 3. The radio interface comprises a transmitter and a receiver, which may be combined into a transceiver, as well as an antenna for radio communication.

According to an aspect of the present disclosure, there is provided a radio device 4 comprising processor circuitry 41, and storage 43 storing instructions 71 executable by said processor circuitry whereby said radio device is operative to, to a CN 5 via a RAN 2, send a request for a first QoS to be associated with a communication bearer between the radio device and the CN via the RAN, the communication bearer comprising a radio bearer 11 between the radio device and a RAN node 3 of the RAN. The radio device is also operative to exchange data over the radio bearer in accordance with the first QoS of the communication bearer. The radio device is also operative to, to the RAN, send an indication that a second QoS, lower than the first QoS, should be used for the radio bearer. The radio device is also operative to exchange data over the radio bearer in accordance with the second QoS.

FIG. 4b is a schematic block diagram functionally illustrating an embodiment of the radio device 4 in FIG. 4a. As previously mentioned, the processor circuitry 41 may run software 71 for enabling the radio device 4 to perform an embodiment of a method of the present disclosure, whereby functional modules may be formed in the radio device 4 e.g. in the processor circuitry 41 for performing the different steps of the method. These modules are schematically illustrated as blocks within the radio device 4. Thus, the radio device 4 comprises a first sending module 45 for, to the CN 5, sending a request for a first QoS to be associated with the communication bearer. The radio device also comprises a first exchanging module 46 for exchanging data over the radio bearer 11 in accordance with the first QoS of the communication bearer. The radio device also comprises a second sending module 47 for, to the RAN 2, sending an indication that a second QoS, lower than the first QoS, should be used for the radio bearer 11. The radio device also comprises a second exchanging module 48 for exchanging data over the radio bearer 11 in accordance with the second QoS.

FIG. 5a schematically illustrates an embodiment of a RAN arrangement 3 in the form of a RAN node, of the present disclosure. The RAN node 3 comprises processor circuitry 51 e.g. a central processing unit (CPU). The processor circuitry 51 may comprise one or a plurality of processing units in the form of microprocessor(s). However, other suitable devices with computing capabilities could be comprised in the processor circuitry 51, e.g. an application specific integrated circuit (ASIC), a field programmable gate array (FPGA) or a complex programmable logic device (CPLD). The processor circuitry 51 is configured to run one or several computer program(s) or software (SW) 72 (see also FIG. 7) stored in a storage 52 of one or several storage unit(s) e.g. a memory. The storage unit is regarded as a computer readable means 74 (see FIG. 7) as discussed herein and may e.g. be in the form of a Random Access Memory (RAM), a Flash memory or other solid state memory, or a hard disk, or be a combination thereof. The processor circuitry 51 may also be configured to store data in the storage 52, as needed. The RAN node 3 also comprises a communication interface 53 for communication with other nodes in the communication network 1 as well as with the radio device over a radio interface. The communication interface comprises a transmitter and a receiver, which may be combined into a transceiver, as well as an antenna for radio communication.

According to another aspect of the present disclosure, there is provided a RAN arrangement 3 for a RAN 2, the arrangement comprising processor circuitry 51, and storage 52 storing instructions 72 executable by said processor circuitry whereby said RAN arrangement is operative to associate a communication bearer between a radio device 4 and a CN 5 via the RAN, including a radio bearer 11 comprised in the communication bearer between the radio device and a RAN arrangement of the RAN, with a first QoS. The RAN arrangement is also operative to initiate forwarding of data over the radio bearer in accordance with the first QoS of the communication bearer. The RAN arrangement is also operative to associate the radio bearer also with a second QoS, lower than the first QoS, while the communication bearer remains associated with the first QoS. The RAN arrangement is also operative to obtain an indication that the second QoS should be used for the radio bearer. The RAN arrangement is also operative to initiate forwarding of data over the radio bearer in accordance with the second QoS.

FIG. 5b is a schematic block diagram functionally illustrating an embodiment of the RAN arrangement 3 (here in the form of a RAN node) in FIG. 5a. As previously mentioned, the processor circuitry 51 may run software 72 for enabling the RAN node 3 to perform an embodiment of a method of the present disclosure, whereby functional modules may be formed in RAN node 3 e.g. in the processor circuitry 51 for performing the different steps of the method. These modules are schematically illustrated as blocks within the RAN node 3. Thus, the RAN arrangement 3 comprises a first associating module 55 for associating the communication bearer, including the radio bearer 11, with a first QoS. The RAN arrangement 3 also comprises a first forwarding module 56 for initiating forwarding of data over the radio bearer 11 in accordance with the first QoS of the communication bearer. The RAN arrangement 3 also comprises a second associating module 57 for associating the radio bearer 11 also with a second QoS, lower than the first QoS, while the communication bearer remains associated with the first QoS. The RAN arrangement 3 also comprises an obtaining module 58 for obtaining an indication that the second QoS should be used for the radio bearer. The RAN arrangement 3 also comprises a second forwarding module 59 for initiating forwarding of data over the radio bearer 11 in accordance with the second QoS.

FIG. 6a schematically illustrates an embodiment of a CN arrangement 6 in the form of a CN node, of the present disclosure. The CN node 6 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 73 (see also FIG. 7) stored in a storage 62 of one or several storage unit(s) e.g. a memory. The storage unit is regarded as a computer readable means 74 (see FIG. 7) as discussed herein and may e.g. be in the form of a Random Access Memory (RAM), a Flash memory or other solid state memory, or a hard disk, or be a combination thereof. The processor circuitry 51 may also be configured to store data in the storage 62, as needed. The CN node 6 also comprises a communication interface 63 for communication with other nodes in the communication network 1. The communication interface comprises a transmitter and a receiver, which may be combined into a transceiver.

According to another aspect of the present disclosure, there is provided a CN arrangement 6 for a CN 5, the arrangement comprising processor circuitry 61, and storage 62 storing instructions 73 executable by said processor circuitry whereby said CN arrangement is operative to obtain a request for a first and a second QoS to be associated with a communication bearer between a radio device and the CN via a RAN, from the radio device, the second QoS being lower than the first QoS. The CN arrangement is also operative to initiate associating of the communication bearer with the first QoS in a PGW 8. The CN arrangement is also operative to initiate associating of a radio bearer 11, comprised in the communication bearer, between the radio device and a RAN node of the RAN with both the first and the second QoS in the RAN.

FIG. 6b is a schematic block diagram functionally illustrating an embodiment of the CN arrangement 6 (here in the form of a RAN node) in FIG. 6a. As previously mentioned, the processor circuitry 61 may run software 73 for enabling the CN node 6 to perform an embodiment of a method of the present disclosure, whereby functional modules may be formed in CN node 6 e.g. in the processor circuitry 61 for performing the different steps of the method. These modules are schematically illustrated as blocks within the CN node 6. Thus, the CN arrangement 6 comprises an obtaining module 65 for obtaining a request for a first and a second QoS to be associated with the communication bearer, from the radio device 4, the second QoS being lower than the first QoS. The CN arrangement 6 also comprises a first associating module 66 for initiating associating of the communication bearer with the first QoS in a PGW 8. The CN arrangement 6 also comprises a second associating module 67 for initiating associating of the radio bearer 11 with both the first and the second QoS in the RAN 2.

Figure 7:
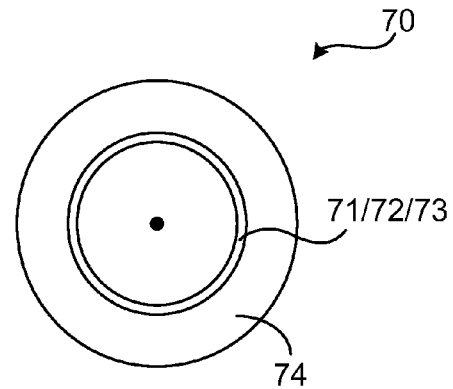
FIG. 7 is a schematic illustration of an embodiment of a computer program product in accordance with the present disclosure.

FIG. 7 illustrates a computer program product 70. The computer program product 70 comprises a computer readable (e.g. non-volatile and/or non-transitory) medium 74 comprising a computer program 71, 72 and/or 73 in the form of computer-executable components. The computer program/computer-executable components 71/72/73 may be configured to cause a radio device 4, a RAN arrangement 3 and/or a CN arrangement 6, e.g. as discussed herein, to perform an embodiment of a method of the present disclosure. The computer program/computer-executable components may be run on the processor circuitry 41/51/61 of the radio device 4/RAN arrangement 3/CN arrangement 6 for causing it to perform the method. The computer program product 70 may e.g. be comprised in a storage unit or memory 43/52/62 comprised in the radio device 4/RAN arrangement 3/CN arrangement 6 and associated with the processor circuitry 41/51/61. Alternatively, the computer program product 70 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium 74 can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 8A:
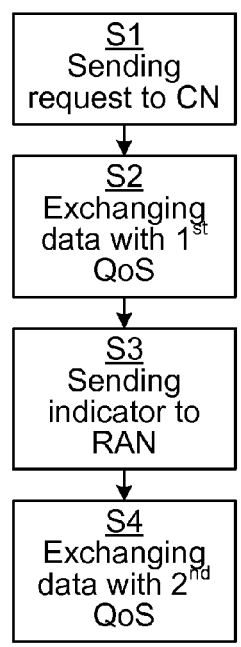
FIG. 8a is a schematic flow chart of an embodiment of a method performed in a radio device, in accordance with the present disclosure.

FIG. 8a is a schematic flow chart of an embodiment of a method performed in the radio device 4 of the present disclosure. The radio device 4 sends S1, to the CN 5, a request for a first QoS to be associated with the communication bearer. Then, the radio device exchanges (send and/or receive) S2 data over the radio bearer 11 (being a part of the communication bearer) in accordance with the first QoS of the communication bearer. This is in accordance with standard procedures. However, in accordance with the present disclosure, the radio device 4 also sends S3 an indication to the RAN 2 that a second QoS, lower than the first QoS, should be used for the radio bearer 11. Preferably, the sent S3 indication is addressed specifically to the RAN 2 or to a RAN arrangement 3 thereof. The second QoS may or may not have previously been associated with the radio bearer 11 in the RAN. Then, the radio device 4 can exchange S4 data over the radio bearer 11 in accordance with the second QoS. The sending S1 a request may also comprise sending a request for the second QoS to be associated with the communication bearer, thus associating the second QoS with the communication bearer (including the radio bearer 11) before the sending S3 of an indication.

Figure 8B:
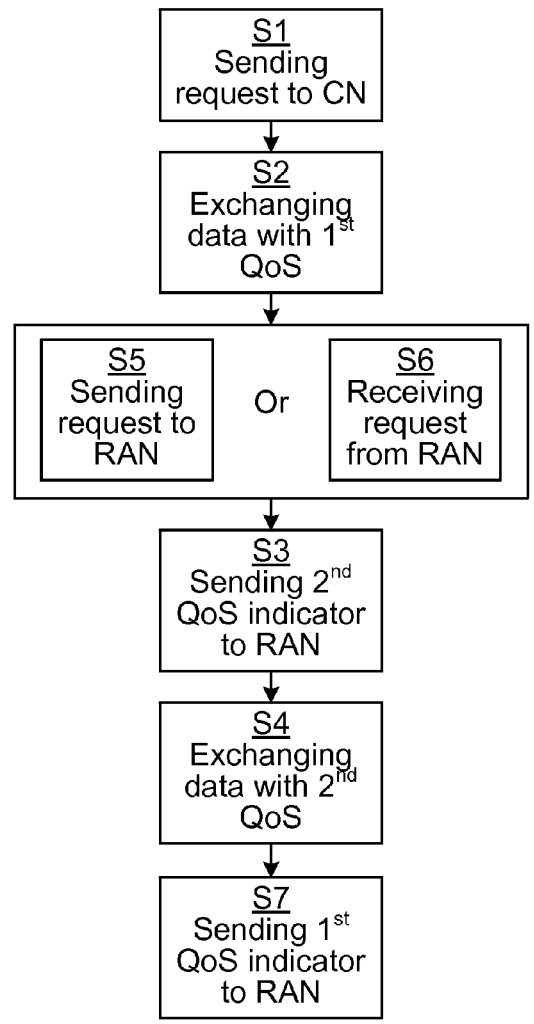
FIG. 8b is a schematic flow chart of other embodiments of a method performed in a radio device, in accordance with the present disclosure.

FIG. 8b is a schematic flow chart of other embodiment of a method performed in the radio device 4 of the present disclosure. The sending S1 a request, exchanging S1 first QoS data, sending S3 an indication and exchanging S4 second QoS data are as discussed above in relation to FIG. 8a. In some embodiments, the radio device 4 sends S5, to the RAN 2, a request for the RAN to associate the second QoS with the radio bearer 11, before the sending S3 of the indication, thus associating the second QoS with the radio bearer 11 (but not necessarily with the whole communication bearer) before the sending S3 of an indication. In some other embodiments, the radio device 4 receives S6, from the RAN 2, a request for the radio device to associate the second QoS with the radio bearer 11, before the sending S3 of the indication, e.g. if the RAN rather than the radio device decides that the use of the second QoS should be enabled. The radio device 4 may thus be informed that the second QoS is available for use. In some embodiments, after the exchanging S4 of data, the radio device 4 may, to the RAN 2, send S7 an indication that the first QoS should be used for the radio bearer 11. This implies that the radio device and RAN may switch back to the use of the first QoS for the radio bearer 11 after having used the second QoS for a while.

Figure 9A:
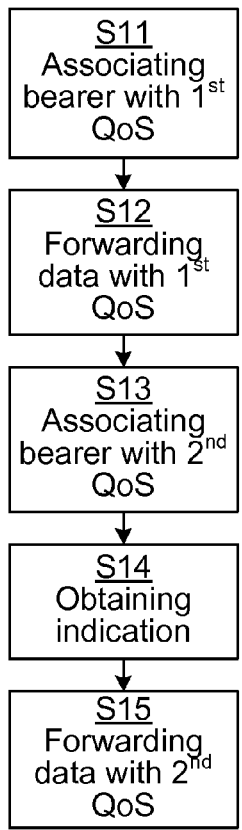
FIG. 9a is a schematic flow chart of an embodiment of a method performed in a RAN arrangement, in accordance with the present disclosure.

FIG. 9a is a schematic flow chart of an embodiment of a method performed in the RAN arrangement 3, e.g. a RAN node, of the present disclosure. The RAN arrangement 3 associates S11 the communication bearer, including the radio bearer 11, with a first QoS. Then, the RAN arrangement 3 initiates forwarding S12 of data over the radio bearer 11 in accordance with the first QoS of the communication bearer. That the RAN arrangement 3 initiates the forwarding implies that it may perform the forwarding itself or it induces another part/node of the RAN 2 to perform the forwarding. The RAN arrangement 3 associates S13 the radio bearer 11 also with a second QoS, lower than the first QoS, while the communication bearer remains associated with the first QoS. This associating S13 may be performed before, in parallel with or after the forwarding S12 of first QoS data, or be combined with the obtaining S14 (see next). The RAN arrangement 3 obtains S14 an indication that the second QoS should be used for the radio bearer 11. The obtaining S13 an indication may comprise receiving the indication from the radio device 4 or from another part of the RAN 2 or from the CN 5, or the RAN arrangement 3 may itself determine that the second QoS should be used for the radio bearer. Then, the RAN arrangement 3 initiates forwarding S15 of data over the radio bearer 11 in accordance with the second QoS. That the RAN arrangement 3 initiates the forwarding S15 implies that it may perform the forwarding itself or it induces another part/node of the RAN 2 to perform the forwarding. In some embodiments, the method is performed in a Node B or a Radio Network Control (RNC) or in an eNB.

Figure 9B:
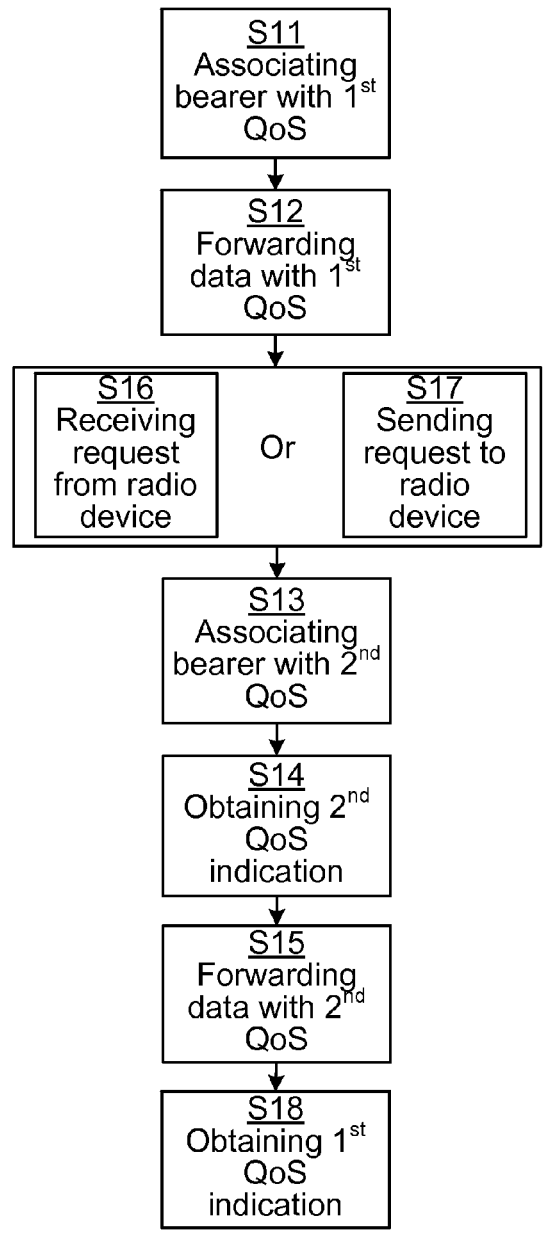
FIG. 9b is a schematic flow chart of other embodiments of a method performed in a RAN arrangement, in accordance with the present disclosure.

FIG. 9b is a schematic flow chart of other embodiments of a method performed in the RAN arrangement 3, e.g. a RAN node, of the present disclosure. The associating S11 the communication bearer, the initiating forwarding S12 of first QoS data, the associating S13 the radio bearer 11, the obtaining S14 an indication, and the initiating forwarding S15 of second QoS data are as discussed above in relation with FIG. 9a. In some embodiments, the RAN arrangement 3 receives S1b, from the radio device 4, a request for the RAN to associate the second QoS with the radio bearer 11, before the associating S13 of the radio bearer 11 also with the second QoS, typically if it is the radio device that initiates the possibility of using the second QoS. In some other embodiments, the RAN arrangement 3 sends S17, to the radio device 4, a request for the radio device to associate the second QoS with the radio bearer 11, before the associating S13 of the radio bearer 11 also with the second QoS, typically if it is the RAN that initiates the possibility of using the second QoS. In some embodiments, the RAN arrangement 3 obtains S18, after the initiating forwarding S15 of data, an indication that the first QoS should be used for the radio bearer. This implies that the radio device and RAN may switch back to the use of the first QoS for the radio bearer 11 after having used the second QoS for a while.

Figure 10:
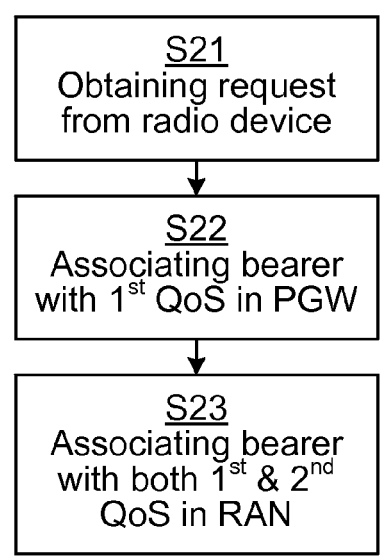
FIG. 10 is a schematic flow chart of an embodiment of a method performed in a CN arrangement, in accordance with the present disclosure.

FIG. 10 is a schematic flow chart of an embodiment of a method performed by a CN arrangement 6, e.g. a CN node, of the present disclosure. The CN arrangement 6 obtains S21 a request for a first and a second QoS to be associated with the communication bearer. The request is from the radio device 4 and may be obtained S21 either directly from the radio device or via another node of the communication network 1. The second QoS is lower than the first QoS. Then, the CN arrangement 6 initiates associating S22 of the communication bearer with the first QoS in a PGW 8. This implies that the CN arrangement either itself associates the first QoS with the communication bearer in the PGW or induces the PGW or another part of the CN to do the associating. Before, in parallel with or after the associating S22, the CN arrangement 6 initiates associating S23 the radio bearer 11 with both the first and the second QoS in the RAN 2. This implies that the CN arrangement 6 induces the RAN 2 to associate the radio bearer with both the first and the second QoS. In some embodiments, the method is performed in an MME 6.

In some embodiments of the present disclosure, the communication bearer is an EPS bearer.

In some embodiments of the present disclosure, the radio device 4 is a mission-critical MTC device.

In order to fulfil the QoS requirements for e.g. a C-MTC device operating in low latency high reliability mode, the RAN arrangement 3 (e.g. eNB, used herein as an example) may need to configure overly robustly encoded transmissions to and from the radio device 4, and additionally has very limited flexibility in the scheduling. The safety margin applied when selecting MCS and e.g. number of Multiple Input, Multiple Output (MIMO) layers to achieve the robust encoding reduces the resources available for other radio devices, and hence reduces the network throughput. Therefore it is advantageous that an application served by a C-MTC device only is requesting to operate according to this high QoS when really needed. For instance services such as remote surgery and industrial steering may require very low latency at least during certain time periods.

In accordance with embodiments of the present disclosure, the radio device 4 configures the eNB 3 with two or more levels of QoS at which it can operate depending on application state. It is advantageous that the first and second QoS levels are pre-defined in order to reduce the latency when changing from one QoS to the other, but it is also contemplated that the QoS levels are not pre-defined by requested in real time. The radio device 4 may then dynamically signal to the eNB 3 whether it requests the first (high) QoS or one of the at least one lower (second, third, etc.) QoS levels. The high QoS configured by the radio device may correspond to the QoS agreed with the PGW 8. Hence, it is only the radio bearer 11 that is dynamically adapted. The signalling allows the eNB to determine whether to prioritize the radio device 4 or whether it can prioritize other radio devices when scheduling the transmissions. As described in the background section, the radio bearer performance has a big impact on the packet delay budget. Hence, by freeing up resources, the eNB may serve other radio devices that momentarily may operate in a mode that calls for higher robustness and prioritized scheduling, or it can use the resources on radio devices with higher tolerance for delays, reliability and bitrates, or for another communication bearer for the same radio device 4.

The high QoS level and the at least one lower QoS level may be configured to the eNB either as explicit requirements on latency, guaranteed bitrate and reliability, or may be configured based on predefined QCIs.

The dynamic switching between different QoS may be carried out e.g. by an extended uplink control information (UCI), with a dedicated Physical Uplink Control Channel (PUCCH) format.

In case the service is to be in a state where only low QoS is needed for a foreseeable (predictable) time exceeding some predefined duration, the application 42 may initiate a bearer resource modification request to relax the QoS between the PGW 8 and the eNB 3. Similarly, when the application is foreseeing that it soon shall operate in a state that calls for the higher QoS, it can initiate a bearer resource modification request to again impose higher QoS between the PGW and the eNB in advance of needing it over the radio bearer 11.

For example, a control application 42 controlling a non-stable process might require low latency, if the state of the service is such that it requires high precision and fast control. On the other hand, in time periods such detailed control may not be required and consequently the latency requirements may be set looser.

The latency requirements may alternatively be determined based on the type of traffic transmitted. For example, the performance in the beginning of a Transmission Control Protocol (TCP) transmission may be dependent on a slow-start phase, whose speed is dependent on the delay until acknowledgements (ACKs) are received. If the RAN arrangement 3 (e.g. eNB) detects, or otherwise knows, that the packet is in the beginning of a TCP transmission, it may assign a tighter latency requirement for the upcoming packets. The communication network 1 can in many situations detect that TCP slow start is ongoing, for instance by packet inspection. Another embodiment would be that the radio device 4 autonomously signals that it wants low latency during the TCP slow start period. The signalling may be similar as in the controller example above (the radio device dynamically requests low latency during the TCP slow start period).

One way to achieve a more robust format that could be used to deliver a higher reliability could e.g. in LTE be a lower MCS value, or scheduling in a way that interference is avoided. With this more robust scheduling format block error rate for the first transmission attempt may be smaller, and consequently the latency lower since no retransmission is usually needed. A typical network setting in High Speed Packet Access (HSPA)/LTE today is to have a BLER of 10%-30% for the first transmission attempt, resulting in much worse delay/latency for 10%-30% of all transmissions.

In order to avoid a situation where all radio devices request low latency, which would mean that there is no distinction between low and high latency radio devices, a cost could be assigned to the request and usage of low latency. Such a cost could be implemented as a higher traffic price for the requested traffic, or as a different subscription policy, or it could also be that requests for low latency only are scheduled with lower peak rates.

Other implementations may include to:
only allow latency control for certain radio devices 4, possibly with higher subscription cost for the user, and/or
only allow the user to be in low latency state for a certain fraction of the time, and/or
only allow the latency control for certified radio devices.

EXAMPLE 1

Figure 11:
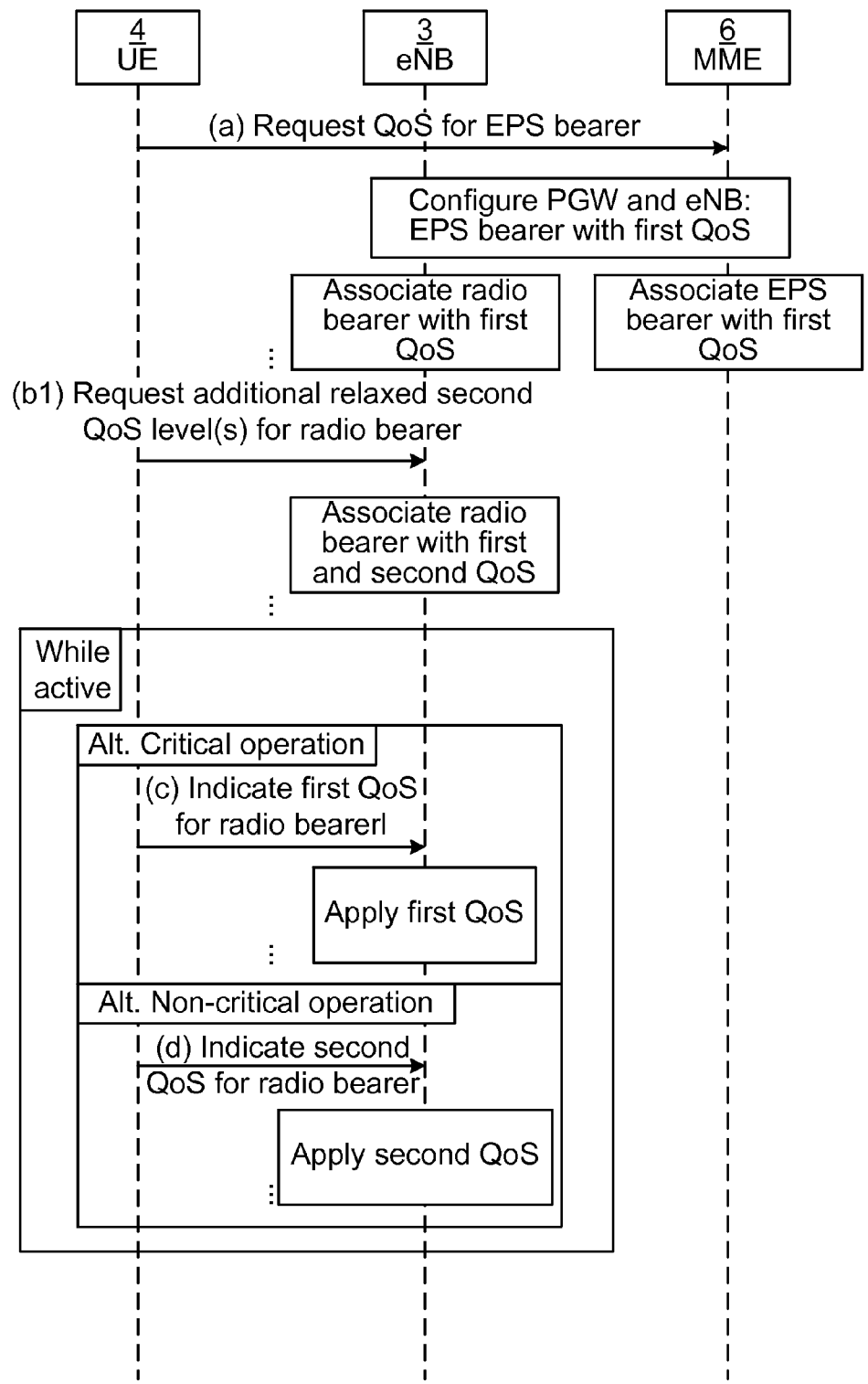
FIG. 11 is a schematic signalling diagram of embodiments of the present disclosure.

FIG. 11 is a signalling diagram illustrating some embodiments of the present disclosure implemented in LTE.

The C-MTC device/UE 4 sends a request (a), e.g. via NAS signalling, to the MME 6 for the first QoS for critical MTC operations.

The MME 6 configures the PGW 8 and the eNB 3 with the requested first QoS level for critical MTC operations. The PGW and eNB associates the said level with the EPS bearer (of which the radio bearer 11 is a part).

The C-MTC device 4 sends a request (b1) for one additional and relaxed second QoS level applicable for the radio bearer 11 for non-critical MTC operations from the eNB 3.

When in critical MTC operation, the C-MTC device sends an indication (c) that the radio bearer first QoS for critical MTC operation shall be used.

When no longer in critical MTC operation, the C-MTC device sends an indication (d) that the radio bearer second QoS level for non-critical MTC operation shall be used.

The C-MTC device 4 switches between the first and second QoS depending on the needs with respect to the service.

EXAMPLE 2

Figure 12:
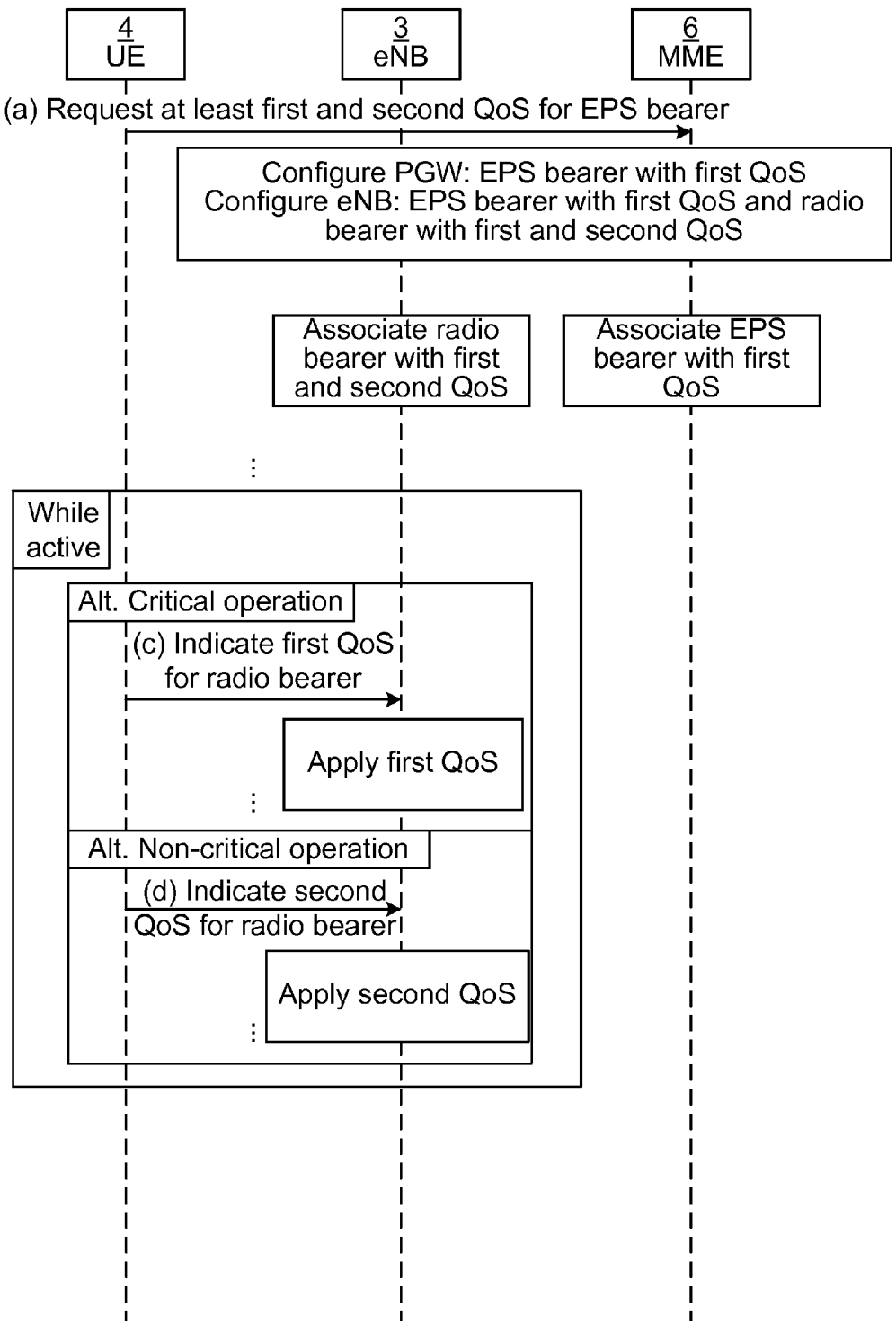
FIG. 12 is a schematic signalling diagram of other embodiments of the present disclosure.

FIG. 12 is a signalling diagram illustrating some embodiments of the present disclosure implemented in LTE.

The C-MTC device/UE 4 sends a request (a), e.g. via NAS signalling, to the MME 6 the first QoS for critical MTC operations and at least one second QoS for non-critical MTC operations.

The MME configures the PGW and the eNB 3 with the requested EPS QoS level for critical MTC operation.

The PGW and eNB associates the first QoS with the EPS bearer (of which the radio bearer—the link between the UE and the eNB—is a part). The eNB further associates the radio bearer with at least two QoS levels: the first QoS for critical MTC operations and the at least one second QoS level for non-critical operations.

When in critical MTC operation, the C-MTC device sends an indication (c) that the radio bearer first QoS for critical MTC operation shall be used.

When no longer in critical MTC operation, the C-MTC device sends an indication (d) that the radio bearer second QoS level for non-critical MTC operation shall be used.

The C-MTC device 4 switches between the first and second QoS depending on the needs with respect to the service.

EXAMPLE 3

Figure 13:
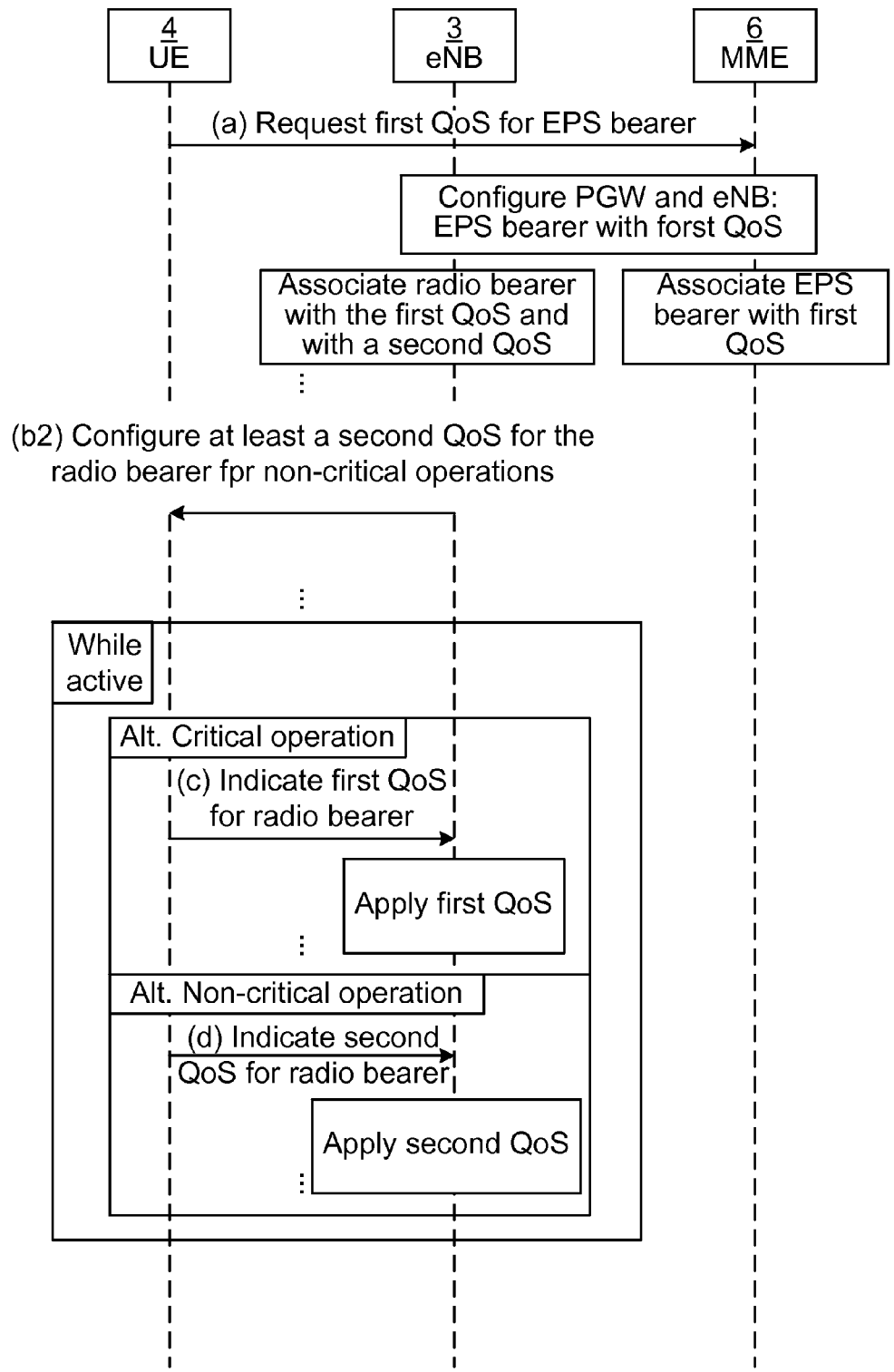
FIG. 13 is a schematic signalling diagram of other embodiments of the present disclosure.

FIG. 13 is a signalling diagram illustrating some embodiments of the present disclosure implemented in LTE.

The C-MTC device/UE 4 sends a request (a), e.g. via NAS signalling, to the MME 6 for the first QoS for critical MTC operations.

The MME 6 configures the PGW 8 and the eNB with the requested first QoS for critical MTC operations. The PGW 8 and eNB 3 associates the first QoS with the EPS bearer (of which the radio bearer 11—the link between the UE and the eNB—is a part).

The eNB 3 further associates the radio bearer with at least one additional (second) QoS for non-critical operations, and informs the UE 4 about the existence of the second QoS by means of a request (b2).

When in critical MTC operation, the C-MTC device sends an indication (c) that the radio bearer first QoS for critical MTC operation shall be used.

When no longer in critical MTC operation, the C-MTC device sends an indication (d) that the radio bearer second QoS level for non-critical MTC operation shall be used.

The C-MTC device 4 switches between the first and second QoS depending on the needs with respect to the service.

EXAMPLE 4

Figure 14:
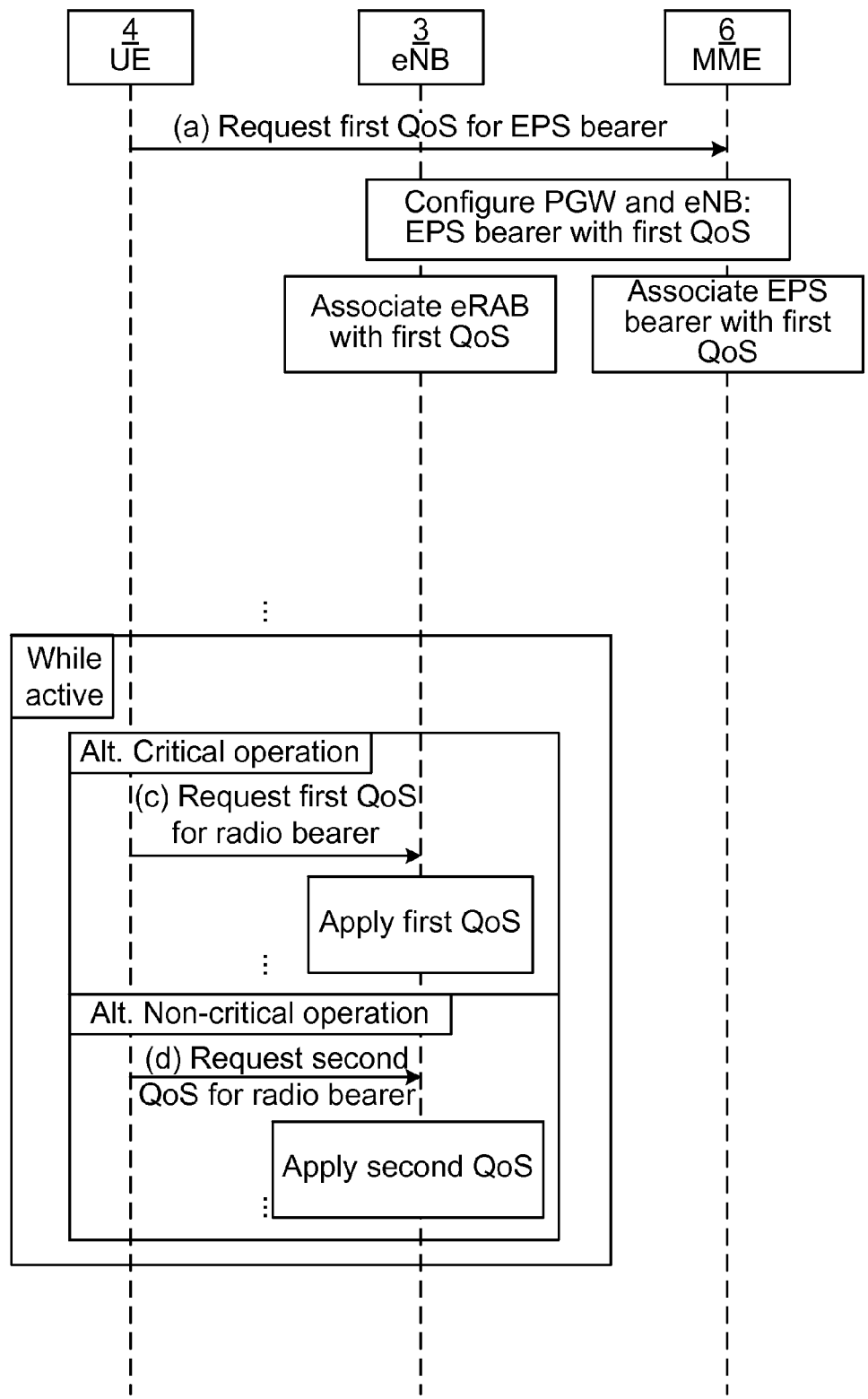
FIG. 14 is a schematic signalling diagram of other embodiments of the present disclosure.

FIG. 14 is a signalling diagram illustrating some embodiments of the present disclosure implemented in LTE.

The C-MTC device/UE 4 sends a request (a), e.g. via NAS signalling, to the MME 6 for the first QoS for critical MTC operations.

The MME 6 configures the PGW 8 and the eNB with the requested first QoS for critical MTC operations. The PGW 8 and eNB 3 associates the first QoS with the EPS bearer (of which the radio bearer 11—the link between the UE and the eNB—is a part).

When in critical MTC operation, the C-MTC device sends an indication (c) that the radio bearer first QoS for critical MTC operation shall be used, in the form of a request to the eNB for a QoS which at most is the same as the first QoS. In these embodiments, the UE 4 can request any QoS for the radio bearer as long as it is the same or lower than first QoS, since the first and second QoS have not been pre-associated with the radio bearer as in the previous examples 1-3.

When no longer in critical MTC operation, the C-MTC device sends an indication (d) that the radio bearer second QoS level for non-critical MTC operation shall be used, in the form of a request to the eNB for the second QoS. Again, in these embodiments, the UE 4 can request any QoS for the radio bearer as long as it is the same or lower than first QoS, since the first and second QoS have not been pre-associated with the radio bearer as in the previous examples 1-3.

The C-MTC device 4 switches between the first and second QoS depending on the needs with respect to the service.

Below follow some other aspects of the present disclosure.

According to an aspect of the present disclosure, there is provided a radio device 4 for being connected to a communication network 1 comprising a CN 5 and a RAN 2, where there is a communication bearer between the radio device and the CN via the RAN comprising a radio bearer 11 between the radio device and a RAN node 3 of the RAN. The radio device 4 comprises means (e.g. the first sending module 45) for, to the CN 5, sending S1 a request a for a first QoS to be associated with the communication bearer. The radio device 4 also comprises means (e.g. the first exchanging module 46) for exchanging S2 data over the radio bearer 11 in accordance with the first QoS of the communication bearer. The radio device 4 also comprises means (e.g. the second sending module 47) for, to the RAN 2, sending S3 an indication d that a second QoS, lower than the first QoS, should be used for the radio bearer 11. The radio device 4 also comprises means (e.g. the second exchanging module 48) for exchanging S4 data over the radio bearer 11 in accordance with the second QoS.

According to another aspect of the present disclosure, there is provided a RAN arrangement (e.g. a RAN node) 3 for being comprised in a communication network 1 also comprising a CN 5 where there is a communication bearer between a radio device 4 connected to the communication network and the CN via the RAN comprising a radio bearer 11 between the radio device and a RAN node of the RAN. The RAN arrangement comprises means (e.g. the first associating module 55) for associating S11 the communication bearer, including the radio bearer 11, with a first QoS. The RAN arrangement also comprises means (e.g. the first forwarding module 56) for initiating forwarding S12 of data over the radio bearer 11 in accordance with the first QoS of the communication bearer. The RAN arrangement also comprises means (e.g. the second associating module 57) for associating S13 the radio bearer 11 also with a second QoS, lower than the first QoS, while the communication bearer remains associated with the first QoS. The RAN arrangement also comprises means (e.g. the obtaining module 58) for obtaining S14 an indication d that the second QoS should be used for the radio bearer. The RAN arrangement also comprises means (e.g. the second forwarding module 59) for initiating forwarding S15 of data over the radio bearer 11 in accordance with the second QoS.

According to another aspect of the present disclosure, there is provided a CN arrangement (e.g. a CN node) 3 for being comprised in a communication network 1 also comprising a RAN 2, where there is a communication bearer between a radio device 4 connected to the communication network and the CN via the RAN comprising a radio bearer 11 between the radio device and a RAN node of the RAN. The CN arrangement 6 comprises means (e.g. the obtaining module 65) for obtaining S21 a request for a first and a second QoS to be associated with the communication bearer, from the radio device 4, the second QoS being lower than the first QoS. The CN arrangement 6 also comprises means (e.g. the first associating module 66) for initiating associating S22 of the communication bearer with the first QoS in a PGW 8. The CN arrangement 6 also comprises means (e.g. the second associating module 67) for initiating associating S23 of the radio bearer 11 with both the first and the second QoS in the RAN 2.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a radio device connected to a communication network comprising a core network (CN) and a Radio Access Network (RAN), where there is a communication bearer between the radio device and the CN via the RAN comprising a radio bearer between the radio device and a RAN node of the RAN, for adapting a Quality of Service (QoS) of the communication bearer, the method comprising:
to the CN, sending a request for a first QoS to be associated with the communication bearer;
exchanging data over the radio bearer in accordance with the first QoS of the communication bearer;
to the RAN, sending a request for the RAN to associate a second QoS, lower than the first QoS, with the radio bearer;
to the RAN, sending an indication that the second QoS should be used for the radio bearer; and
exchanging data over the radio bearer in accordance with the second QoS.

2. The method of claim 1, further comprising:
after the exchanging of data, to the RAN, sending an indication that the first QoS should be used for the radio bearer.

3. The method of claim 1, wherein the communication bearer is an Evolved Packet System (EPS) bearer.

4. The method of claim 1, wherein the radio device is a mission-critical Machine Type Communication (MTC) device.

5. The method of claim 1, wherein the sending the request also comprises sending a request for the second QoS to be associated with the communication bearer.

6. A method performed in a radio device connected to a communication network comprising a core network (CN) and a Radio Access Network (RAN), where there is a communication bearer between the radio device and the CN via the RAN comprising a radio bearer between the radio device and a RAN node of the RAN, for adapting a Quality of Service (QoS) of the communication bearer, the method comprising:
to the CN, sending a request for a first QoS to be associated with the communication bearer, wherein the sending the request also comprises sending a request for a second QoS, lower than the first QoS, to be associated with the communication bearer;
exchanging data over the radio bearer in accordance with the first QoS of the communication bearer;
to the RAN, sending an indication that the second QoS should be used for the radio bearer; and
exchanging data over the radio bearer in accordance with the second QoS.

7. A method performed in a radio device connected to a communication network comprising a core network (CN) and a Radio Access Network (RAN), where there is a communication bearer between the radio device and the CN via the RAN comprising a radio bearer between the radio device and a RAN node of the RAN, for adapting a Quality of Service (QoS) of the communication bearer, the method comprising:
to the CN, sending a request for a first QoS to be associated with the communication bearer;
exchanging data over the radio bearer in accordance with the first QoS of the communication bearer;
from the RAN, receiving a request for the radio device to associate a second QoS, lower than the first QoS, with the radio bearer;
to the RAN, sending an indication that the second QoS should be used for the radio bearer; and
exchanging data over the radio bearer in accordance with the second QoS.

8. A method performed in a Radio Access Network (RAN), comprised in a communication network also comprising a core network (CN) where there is a communication bearer between a radio device connected to the communication network and the CN via the RAN comprising a radio bearer between the radio device and a RAN node of the RAN, for adapting a Quality of Service (QoS) of the communication bearer, the method comprising:
associating the communication bearer, including the radio bearer, with a first QoS;
initiating forwarding of data over the radio bearer in accordance with the first QoS of the communication bearer;
associating the radio bearer also with a second QoS, lower than the first QoS, while the communication bearer remains associated with the first QoS;
obtaining an indication that the second QoS should be used for the radio bearer; and
initiating forwarding of data over the radio bearer in accordance with the second QoS.

9. The method of claim 8, further comprising:
from the radio device, receiving a request for the RAN to associate the second QoS with the radio bearer, before the associating of the radio bearer also with the second QoS.

10. The method of claim 8, further comprising:
to the radio device, sending a request for the radio device to associate the second QoS with the radio bearer, before the associating of the radio bearer also with the second QoS.

11. The method of claim 8, further comprising:
after the initiating forwarding of data, obtaining an indication that the first QoS should be used for the radio bearer.

12. The method of claim 8, wherein the method is performed in a Node B or a Radio Network Control (RNC) or in an evolved Node B (eNB).

13. A method performed in a Core Network (CN) comprised in a communication network also comprising a Radio Access Network (RAN), where there is a communication bearer between a radio device connected to the communication network and the CN via the RAN comprising a radio bearer between the radio device and a RAN node of the RAN, for adapting a Quality of Service (QoS) of the communication bearer, the method comprising:
 obtaining a request for a first and a second QoS to be associated with the communication bearer, from the radio device, the second QoS being lower than the first QoS;
 initiating associating of the communication bearer with the first QoS in a Packet Data Network Gateway (PGW); and
 initiating associating of the radio bearer with both the first and the second QoS in the RAN.

14. The method of claim 13, wherein the method is performed in a Mobility Management Entity (MME).

15. A radio device comprising:
 processor circuitry; and
 storage storing instructions executable by said processor circuitry whereby said radio device is operative to:
 to a Core Network (CN) via a Radio Access Network (RAN), send a request for a first QoS to be associated with a communication bearer between the radio device and the CN via the RAN comprising a radio bearer between the radio device and a RAN node of the RAN;
 exchange data over the radio bearer in accordance with the first QoS of the communication bearer;
 to the RAN, send a request for the RAN to associate a second QoS, lower than the first QoS, with the radio bearer;
 to the RAN, send an indication that the second QoS should be used for the radio bearer; and
 exchange data over the radio bearer in accordance with the second QoS.

16. A RAN arrangement for a Radio Access Network (RAN), the arrangement comprising:
 processor circuitry; and
 storage storing instructions executable by said processor circuitry whereby said RAN arrangement is operative to:
 associate a communication bearer between a radio device and a Core Network (CN) via the RAN, including a radio bearer comprised in the communication bearer between the radio device and a RAN node of the RAN, with a first QoS;
 initiate forwarding of data over the radio bearer in accordance with the first QoS of the communication bearer;
 associate the radio bearer also with a second QoS, lower than the first QoS while, the communication bearer remains associated with the first QoS;
 obtain an indication that the second QoS should be used for the radio bearer; and
 initiate forwarding of data over the radio bearer in accordance with the second QoS.

17. A Core Network (CN) arrangement for a CN, the arrangement comprising:
 processor circuitry; and
 storage storing instructions executable by said processor circuitry whereby said CN arrangement is operative to:
 obtain a request for a first and a second QoS to be associated with a communication bearer between a radio device and the CN via a Radio Access Network (RAN), from the radio device, the second QoS being lower than the first QoS;
 initiate associating of the communication bearer with the first QoS in a Packet Data Network Gateway (PGW); and
 initiate associating of a radio bearer comprised in the communication bearer between the radio device and a RAN node of the RAN with both the first and the second QoS in the RAN.

18. A nontransitory computer-readable storage medium comprising a computer program for adapting a Quality of Service (QoS) of a communication bearer between a radio device and a Core Network (CN) via a Radio Access Network (RAN), the communication bearer comprising a radio bearer between the radio device and a RAN node of the RAN, the computer program comprising computer program code which is able to, when run on processor circuitry of the radio device, cause the radio device to:
 to the CN, send a request for a first QoS to be associated with the communication bearer;
 exchange data over the radio bearer in accordance with the first QoS of the communication bearer;
 to the RAN, send a request for the RAN to associate a second QoS, lower than the first QoS, with the radio bearer;
 to the RAN, send an indication that the second QoS should be used for the radio bearer; and
 exchange data over the radio bearer in accordance with the second QoS.

19. A nontransitory computer-readable storage medium comprising a computer program for adapting a Quality of Service (QoS) of a communication bearer between a radio device and a Core Network (CN) via a Radio Access Network (RAN), the communication bearer comprising a radio bearer between the radio device and a RAN node of the RAN, the computer program comprising computer program code which is able to, when run on processor circuitry of a RAN arrangement, cause the RAN arrangement to:
 associate the communication bearer, including the radio bearer, with a first QoS;
 initiate forwarding of data over the radio bearer in accordance with the first QoS of the communication bearer;
 associate the radio bearer also with a second QoS, lower than the first QoS, while the communication bearer remains associated with the first QoS;
 obtain an indication that the second QoS should be used for the radio bearer; and
 initiate forwarding of data over the radio bearer in accordance with the second QoS.

20. A nontransitory computer-readable storage medium comprising a computer program for adapting a Quality of Service (QoS) of a communication bearer between a radio device and a Core Network (CN) via a Radio Access Network (RAN), the communication bearer comprising a radio bearer between the radio device and a RAN node of the RAN, the computer program comprising computer program code which is able to, when run on processor circuitry of a CN arrangement, cause the CN arrangement to:
 obtain a request for a first and a second QoS to be associated with the communication bearer, from the radio device, the second QoS being lower than the first QoS;
 initiate associating of the communication bearer with the first QoS in a Packet Data Network Gateway (PGW); and
 initiate associating of the radio bearer with both the first and the second QoS in the RAN.

21. A radio device comprising:
processor circuitry; and
storage storing instructions executable by said processor circuitry whereby said radio device is operative to:
- to a Core Network (CN) via a Radio Access Network (RAN), send a request for a first QoS and a second QoS, lower than the first QoS, to be associated with a communication bearer between the radio device and the CN via the RAN comprising a radio bearer between the radio device and a RAN node of the RAN;
- exchange data over the radio bearer in accordance with the first QoS of the communication bearer;
- to the RAN, send an indication that the second QoS should be used for the radio bearer; and
- exchange data over the radio bearer in accordance with the second QoS.

22. A radio device comprising:
processor circuitry; and
storage storing instructions executable by said processor circuitry whereby said radio device is operative to:
- to a Core Network (CN) via a Radio Access Network (RAN), send a request for a first QoS to be associated with a communication bearer between the radio device and the CN via the RAN comprising a radio bearer between the radio device and a RAN node of the RAN;
- exchange data over the radio bearer in accordance with the first QoS of the communication bearer;
- from the RAN, receive a request for the radio device to associate a second QoS, lower than the first QoS, with the radio bearer;
- to the RAN, send an indication that the second QoS should be used for the radio bearer; and
- exchange data over the radio bearer in accordance with the second QoS.

23. A nontransitory computer-readable storage medium comprising a computer program for adapting a Quality of Service (QoS) of a communication bearer between a radio device and a Core Network (CN) via a Radio Access Network (RAN), the communication bearer comprising a radio bearer between the radio device and a RAN node of the RAN, the computer program comprising computer program code which is able to, when run on processor circuitry of the radio device, cause the radio device to:
- to the CN, send a request for a first QoS and a second QoS, lower than the first QoS, to be associated with the communication bearer;
- exchange data over the radio bearer in accordance with the first QoS of the communication bearer;
- to the RAN, send an indication that the second QoS should be used for the radio bearer; and
- exchange data over the radio bearer in accordance with the second QoS.

24. A nontransitory computer-readable storage medium comprising a computer program for adapting a Quality of Service (QoS) of a communication bearer between a radio device and a Core Network (CN) via a Radio Access Network (RAN), the communication bearer comprising a radio bearer between the radio device and a RAN node of the RAN, the computer program comprising computer program code which is able to, when run on processor circuitry of the radio device, cause the radio device to:
- to the CN, send a request for a first QoS to be associated with the communication bearer;
- exchange data over the radio bearer in accordance with the first QoS of the communication bearer;
- from the RAN, receive a request for the radio device to associate a second QoS, lower than the first QoS, with the radio bearer
- to the RAN, send an indication that the second QoS should be used for the radio bearer; and
- exchange data over the radio bearer in accordance with the second QoS.

* * * * *